US010328964B1

(12) United States Patent
Carey

(10) Patent No.: US 10,328,964 B1
(45) Date of Patent: Jun. 25, 2019

(54) DOUBLE STROLLER

(71) Applicant: Eunice S. Carey, Bordentown, NJ (US)

(72) Inventor: Eunice S. Carey, Bordentown, NJ (US)

(*) Notice: Subject to any disclaimer, the term of this patent is extended or adjusted under 35 U.S.C. 154(b) by 7 days.

(21) Appl. No.: 15/701,583

(22) Filed: Sep. 12, 2017

(51) Int. Cl.
B62D 7/06 (2006.01)
B62B 7/00 (2006.01)
B62B 9/24 (2006.01)
B62B 9/26 (2006.01)

(52) U.S. Cl.
CPC ............ *B62B 7/008* (2013.01); *B62B 9/24* (2013.01); *B62B 9/26* (2013.01)

(58) Field of Classification Search
CPC .......... B62B 7/008; B62B 7/06; B62B 7/064; B62B 7/145; B62B 9/24; B62B 9/26; B62B 9/102
See application file for complete search history.

(56) References Cited

U.S. PATENT DOCUMENTS

| | | | | |
|---|---|---|---|---|
| 2,769,482 A * | 11/1956 | Carlson | ..................... | B62B 9/28 280/47.35 |
| 3,223,431 A * | 12/1965 | Gottfried | ................. | B62B 7/14 280/47.38 |
| 4,728,112 A * | 3/1988 | Wynens | ..................... | B62B 7/00 280/474 |
| 4,750,783 A * | 6/1988 | Irby | ..................... | B60N 2/2848 297/130 |
| 4,768,795 A * | 9/1988 | Mar | ..................... | B60N 2/2806 280/30 |
| 5,033,761 A * | 7/1991 | Kelly | ........................ | B62B 7/04 280/47.38 |
| 5,167,425 A * | 12/1992 | Chen | ........................ | B62B 7/12 280/47.4 |
| 5,338,096 A * | 8/1994 | Huang | .................... | B62B 7/142 280/30 |
| 5,454,584 A * | 10/1995 | Haut | ........................ | B62B 7/08 280/642 |
| D378,455 S | 3/1997 | Wilson | | |
| 5,653,460 A | 8/1997 | Fogarty | | |
| D430,076 S | 8/2000 | Gehr | | |
| 6,752,405 B1 | 6/2004 | Wright | | |
| 8,282,119 B1 | 10/2012 | Caksa | | |
| 8,322,745 B2 * | 12/2012 | Li | ............................ | B62B 9/28 280/47.4 |
| 8,398,143 B1 * | 3/2013 | Haley | ....................... | B62B 7/00 296/65.06 |

(Continued)

FOREIGN PATENT DOCUMENTS

JP 10291480 A * 11/1998 ............. B62B 7/008

*Primary Examiner* — James A Shriver, II
*Assistant Examiner* — Steve Clemmons
(74) *Attorney, Agent, or Firm* — Kyle A. Fletcher, Esq.

(57) ABSTRACT

The double stroller is a stroller that is configured for use with a plurality of children. The double stroller comprises an anterior seat and a posterior seat. The occupant of the anterior seat faces the anterior direction of the stroller. The occupant of the posterior seat faces the posterior direction of the stroller. The double stroller comprises a seating assembly, a frame, and a storage bin. The seating assembly forms the anterior seat and the posterior seat. The frame supports the seating assembly above the supporting surface upon which the double stroller is placed. The storage bin is a space dedicated to the storage of miscellaneous items.

19 Claims, 4 Drawing Sheets

(56) References Cited

U.S. PATENT DOCUMENTS

| | | | |
|---|---|---|---|
| 8,876,146 B2 * | 11/2014 | Smith, Jr. | ............... B62B 7/062 |
| | | | 280/642 |
| 9,399,477 B2 * | 7/2016 | Iftinca | ....................... B62B 7/06 |
| 10,065,669 B2 * | 9/2018 | Mattarocci | ............. B62B 9/104 |
| 2003/0122352 A1 * | 7/2003 | Moscovich | ............... B62B 7/06 |
| | | | 280/648 |
| 2005/0166861 A1 | 8/2005 | King | |
| 2011/0031708 A1 * | 2/2011 | Cheng | .................... B62B 7/145 |
| | | | 280/47.38 |
| 2011/0175330 A1 | 7/2011 | Smith | |

* cited by examiner

DOUBLE STROLLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and land vehicles, more specifically, a hand propelled carriage for two or more children.

SUMMARY OF INVENTION

The double stroller is a stroller that is configured for use with a plurality of children. The double stroller comprises an anterior seat and a posterior seat. The occupant of the anterior seat faces the anterior direction of the stroller. The occupant of the posterior seat faces the posterior direction of the stroller. The double stroller comprises a seating assembly, a frame, and a storage bin. The seating assembly forms the anterior seat and the posterior seat. The frame supports the seating assembly above the supporting surface upon which the double stroller is placed. The storage bin is a space dedicated to the storage of miscellaneous items.

These together with additional objects, features and advantages of the double stroller will be readily apparent to those of ordinary skill in the art upon reading the following detailed description of the presently preferred, but nonetheless illustrative, embodiments when taken in conjunction with the accompanying drawings.

In this respect, before explaining the current embodiments of the double stroller in detail, it is to be understood that the double stroller is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the double stroller.

It is therefore important that the claims be regarded as including such equivalent construction insofar as they do not depart from the spirit and scope of the double stroller. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
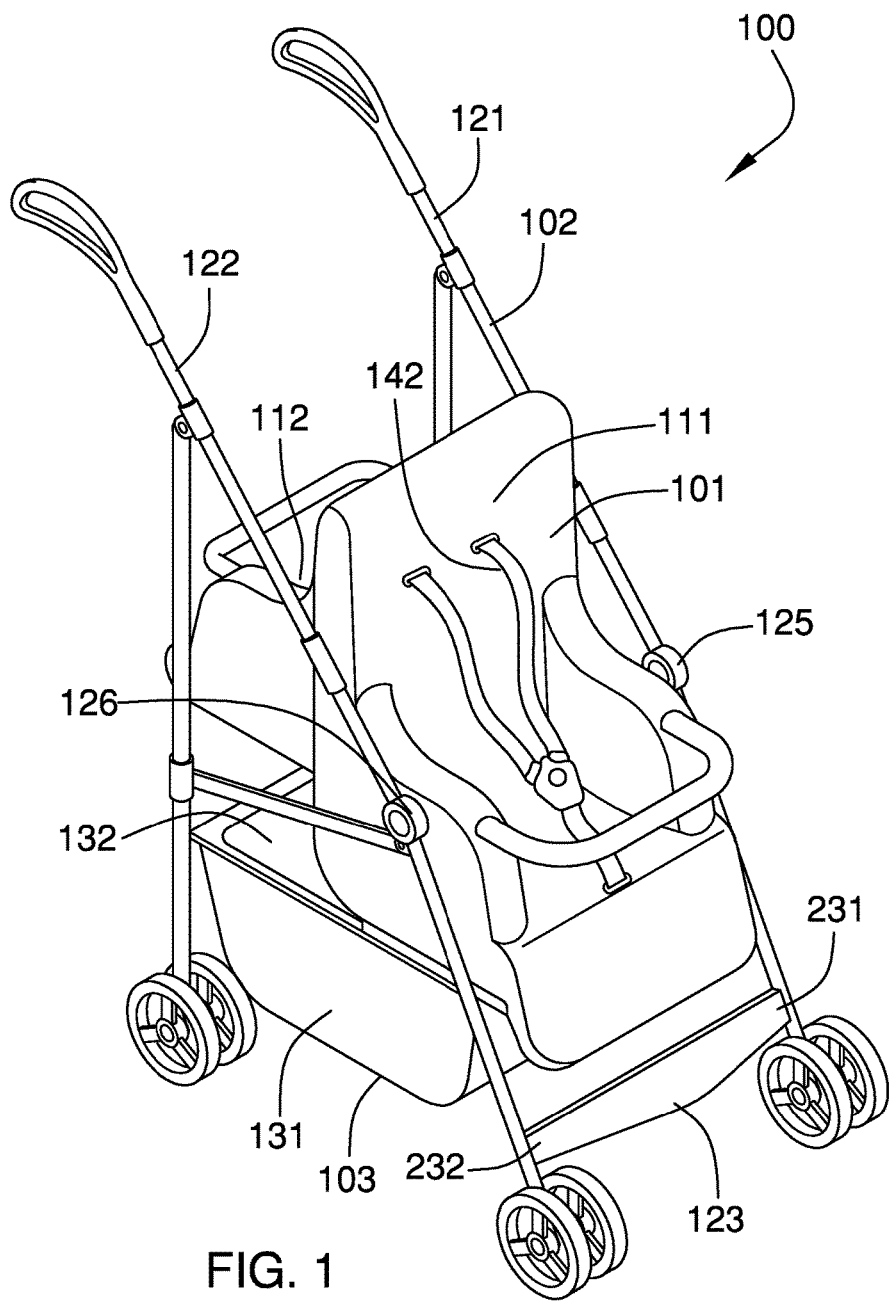
FIG. 1 is a perspective view of an embodiment of the disclosure.
Figure 2:
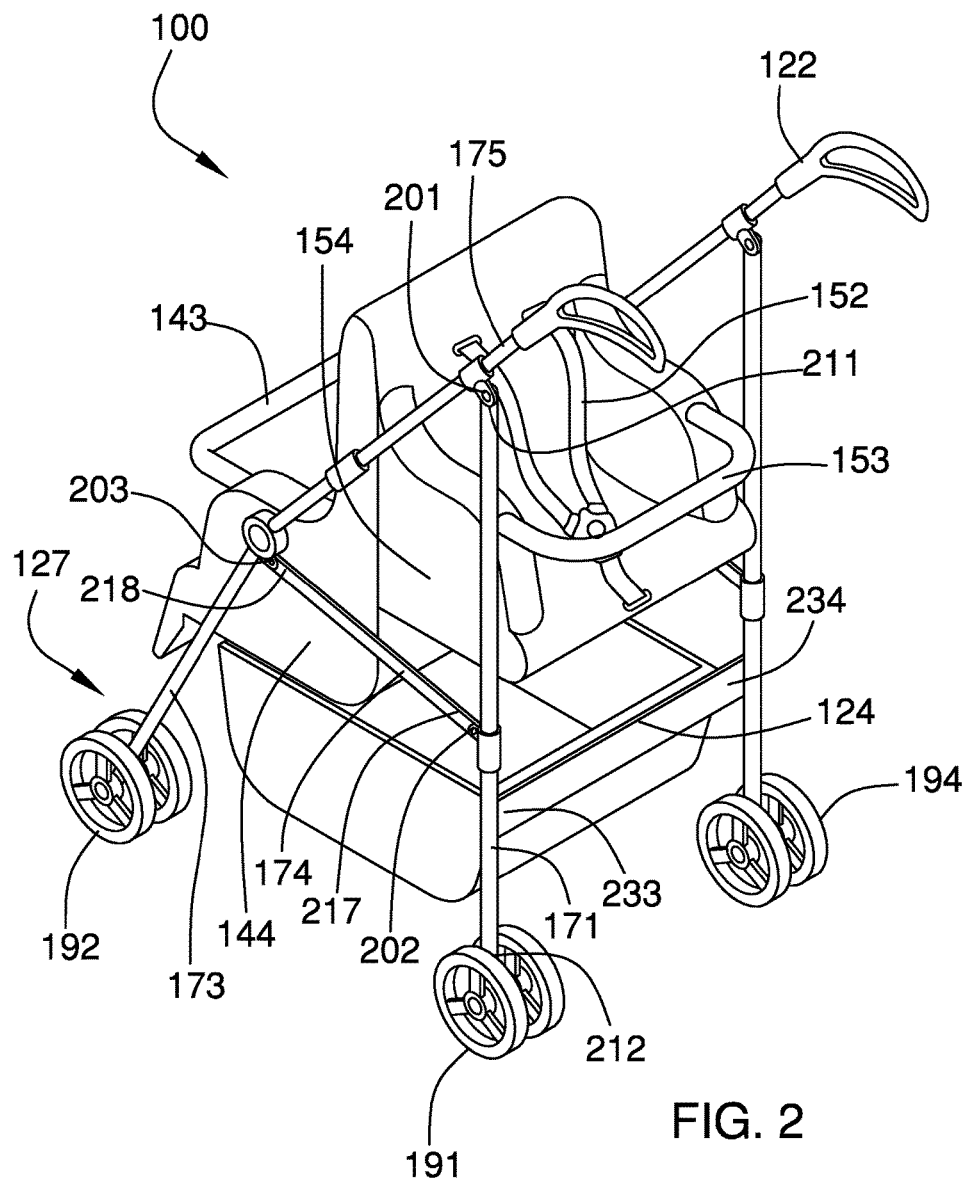
FIG. 2 is a reverse perspective view of an embodiment of the disclosure.
Figure 3:
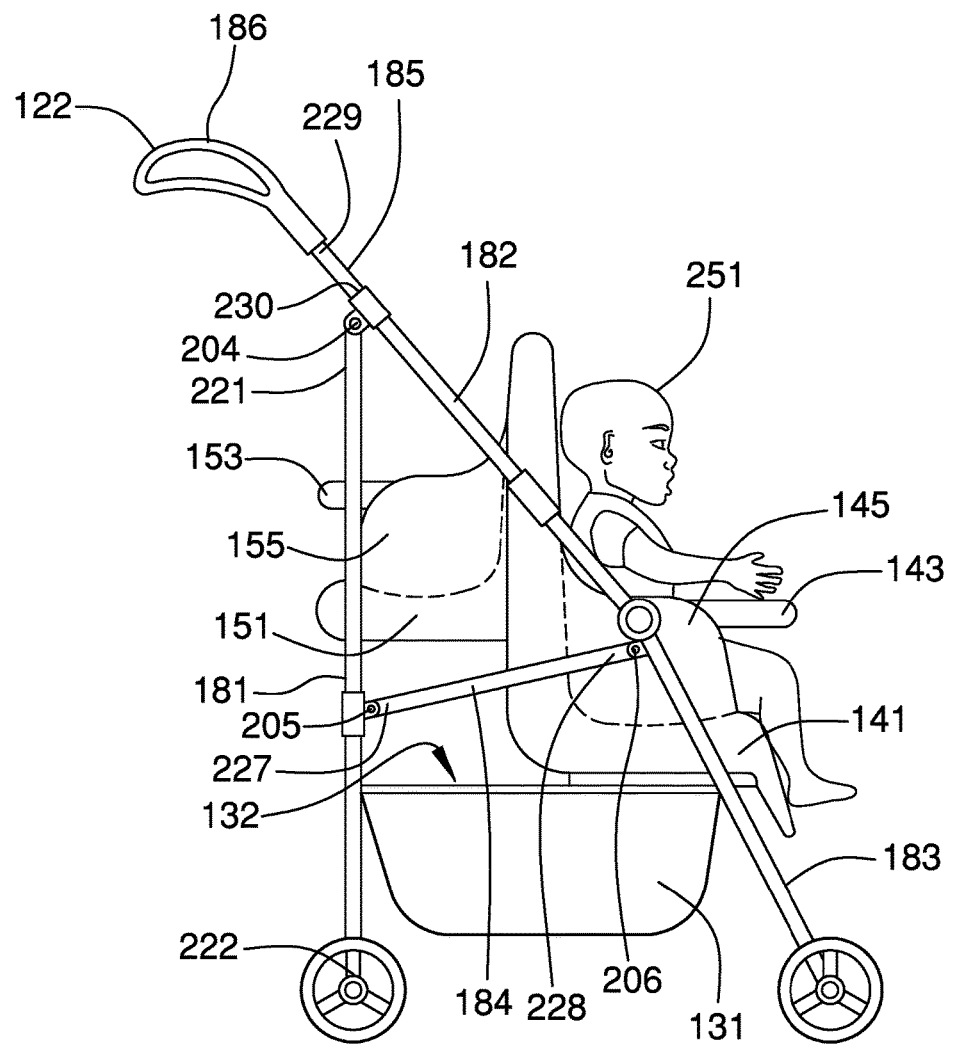
FIG. 3 is a side view of an embodiment of the disclosure.
Figure 4:
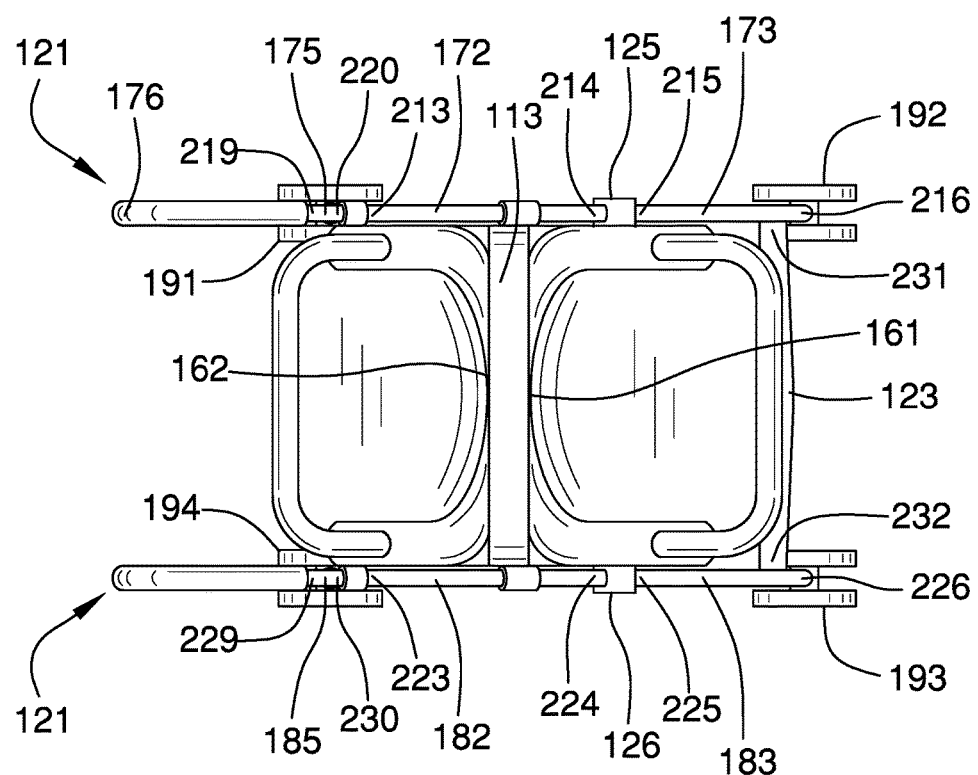
FIG. 4 is a top view of an embodiment of the disclosure.

Detailed reference will now be made to one or more potential embodiments of the disclosure, which are illustrated in FIGS. 1 through 4.

The double stroller 100 (hereinafter invention) is a stroller that is configured for use with a plurality of children. The invention 100 comprises an anterior seat 111 and a posterior seat 112. The occupant 251 of the anterior seat 111 faces the anterior direction of the stroller. The occupant 251 of the posterior seat 112 faces the posterior direction of the stroller. The invention 100 comprises a seating assembly 101, a frame 102, and a storage bin 103. The seating assembly 101 forms the anterior seat 111 and the posterior seat 112. The frame 102 supports the seating assembly 101 above the supporting surface upon which the invention 100 is placed. The storage bin 103 is a space dedicated to the storage of miscellaneous items.

The seating assembly 101 is a dual seat structure in which the occupants 251 of the chair are seated. The two seats of the seating assembly 101 face opposite directions and share the same back plate 113. The seating assembly 101 comprises an anterior seat 111, a posterior seat 112, and a back plate 113. The back plate 113 is further defined with an anterior surface 161 and a posterior surface 162. The occupants 251 of the anterior seat 111 and the posterior seat 112 face in opposite directions.

The anterior seat 111 is the forward facing seat of the seating assembly 101 when the seating assembly 101 is installed normally in the frame 102. The anterior seat 111 comprises an anterior bench 141, an anterior 3 point harness 142, an anterior guardrail 143, an anterior left sidewall 144, and an anterior right sidewall 145.

The anterior bench 141 is a horizontal surface that projects perpendicularly away from the anterior surface 161 of the back plate 113. The anterior bench 141 provides horizontal support for the occupant 251 of the anterior seat 111. The anterior bench 141 is covered in a padding material that acts as a cushion. Suitable padding material includes, but is not limited to, polyurethane.

The anterior 3 point harness 142 is a commercially available harness that secures the shoulders and the groin of the occupant 251 to the anterior seat 111.

The anterior guardrail 143 is a member that forms a barrier that prevents the occupant 251 of the anterior bench 141 from falling out of the anterior bench 141 in a direction away from the back plate 113. The anterior left sidewall 144 is a barrier that prevents the occupant 251 of the anterior bench 141 from falling out of the left side of the anterior bench 141. The anterior left sidewall 144 is covered in a padding material that acts as a cushion. Suitable padding material includes, but is not limited to, polyurethane. The anterior right sidewall 145 is a barrier that prevents the occupant 251 of the anterior bench 141 from falling out of the right side of the anterior bench 141. The anterior right sidewall 145 is covered in a padding material that acts as a cushion. Suitable padding material includes, but is not limited to, polyurethane.

The posterior seat 112 is the rearward facing seat of the seating assembly 101 when the seating assembly 101 is installed normally in the frame 102. The posterior seat 112 comprises a posterior bench 151, a posterior 3 point harness 152, a posterior guardrail 153, a posterior left sidewall 154, and a posterior right sidewall 155.

The posterior bench 151 is a horizontal surface that projects perpendicularly away from the posterior surface 162 of the back plate 113. The posterior bench 151 provides horizontal support for the occupant 251 of the posterior seat 112. The posterior bench 151 is covered in a padding material that acts as a cushion. Suitable padding material includes, but is not limited to, polyurethane.

The posterior 3-point harness 152 is a commercially available harness that secures the shoulders and the groin of the occupant 251 to the posterior seat 112.

The posterior guardrail 153 is a member that forms a barrier that prevents the occupant 251 of the posterior bench 151 from falling out of the posterior bench 151 in a direction away from the back plate 113. The posterior left sidewall 154 is a barrier that prevents the occupant 251 of the posterior bench 151 from falling out of the left side of the posterior bench 151. The posterior left sidewall 154 is covered in a padding material that acts as a cushion. Suitable padding material includes, but is not limited to, polyurethane. The posterior right sidewall 155 is a barrier that prevents the occupant 251 of the posterior bench 151 from falling out of the right side of the posterior bench 151. The posterior right sidewall 155 is covered in a padding material that acts as a cushion. Suitable padding material includes, but is not limited to, polyurethane.

The back plate 113 is a rectangular plate structure that forms the vertical backrest of both the anterior seat 111 and the posterior seat 112. The back plate 113 is covered in a padding material that acts as a cushion. Suitable padding material includes, but is not limited to, polyurethane. The anterior surface 161 is the surface of the back plate 113 that is proximal to the anterior seat 111 and proximal to the left handle grip 176 and the right handle grip 186. The posterior surface 162 is the surface of the back plate 113 that is proximal to the posterior seat 112 and distal from the left handle grip 176 and the right handle grip 186.

The frame 102 is a scaffolding that supports the seating assembly 101 above a supporting surface upon which the invention 100 is placed. The load path of the frame 102 is terminated with a plurality of wheels 127 that allows the invention 100 to be rolled along the supporting surface. The frame 102 comprises a left trestle 121, a right trestle 122, an anterior crosspiece 123, a posterior crosspiece 124, a left anchor 125, a right anchor 126, and the plurality of wheels 127.

The left trestle 121 is an open framework of interconnected members that supports the left side of the invention 100. The left trestle 121 comprises a left posterior brace 171, a left superior brace 172, a left anterior brace 173, a left spreader brace 174, a left handle extension 175, and a left handle grip 176. The left trestle 121 further comprises a first hinge 201, a second hinge 202, and a third hinge 203.

The left posterior brace 171 is further defined with a first end 211 and a second end 212. The left superior brace 172 is further defined with a third end 213 and a fourth end 214. The left anterior brace 173 is further defined with a fifth end 215 and a sixth end 216. The left spreader brace 174 is further defined with a seventh end 217 and an eighth end 218. The left handle extension 175 is further defined with a ninth end 219 and a tenth end 220.

The left posterior brace 171 is a commercially available telescopic shaft. The left superior brace 172 is a commercially available telescopic shaft. The left anterior brace 173 is a commercially available shaft. The left spreader brace 174 is a commercially available shaft. The left handle extension 175 is a commercially available shaft. The left handle grip 176 is a loop like structure that forms a grip.

The first hinge 201 is a commercially available locking hinge. The second hinge 202 is a commercially available locking hinge. The third hinge 203 is a commercially available locking hinge.

The right trestle 122 is an open framework of interconnected members that supports the right side of the invention 100. The right trestle 122 comprises a right posterior brace 181, a right superior brace 182, a right anterior brace 183, a right spreader brace 184, a right handle extension 185, and a right handle grip 186. The right trestle 122 further comprises a fourth hinge 204, a fifth hinge 205, and a sixth hinge 206.

The right posterior brace 181 is further defined with an eleventh end 221 and a twelfth end 222. The right superior brace 182 is further defined with a thirteenth end 223 and a fourteenth end 224. The right anterior brace 183 is further defined with a fifteenth end 225 and a sixteenth end 226. The right spreader brace 184 is further defined with a seventeenth end 227 and an eighteenth end 228. The right handle extension 185 is further defined with a nineteenth end 229 and a twentieth end 230 The right posterior brace 181 is a commercially available telescopic shaft. The right superior brace 182 is a commercially available telescopic shaft. The right anterior brace 183 is a commercially available shaft. The right spreader brace 184 is a commercially available shaft. The right handle extension 185 is a commercially available shaft. The right handle grip 186 is a loop like structure that forms a grip.

The fourth hinge 204 is a commercially available locking hinge. The fifth hinge 205 is a commercially available locking hinge. The sixth hinge 206 is a commercially available locking hinge.

Each of the plurality of wheels 127 forms the final link in the load path from the seating assembly 101 to the supporting surface. The plurality of wheels 127 allows the invention 100 to roll along the supporting surface. The plurality of wheels 127 comprises a first wheel 191, a second wheel 192, a third wheel 193, and a fourth wheel 194. The first wheel 191 is a commercially available wheel. The second wheel 192 is a rotating device that is selected from the group consisting of a wheel or a caster. The third wheel 193 is a rotating device that is selected from the group consisting of a wheel or a caster. The fourth wheel 194 is a commercially available wheel.

The anterior crosspiece 123 is a member that attaches the left trestle 121 to the right trestle 122. The posterior crosspiece 124 is a member that attaches the left trestle 121 to the right trestle 122. The left anchor 125 is a rotating structure that attaches the left trestle 121 to the anterior seat 111. The right anchor 126 is a rotating structure that attaches the right trestle 122 to the anterior seat 111. The anterior crosspiece 123 is further defined with a twenty first end 231 and a twenty second end 232. The posterior crosspiece 124 is further defined with a twenty third end 233 and a twenty fourth end 234.

The storage bin 103 is storage compartment that is located underneath the seating assembly 101. The storage bin 103 is a container 131 that is further defined with an open face 132. The container 131 is a rectilinear container within which personal articles may be stored. Methods to form a container 131 are well known in the mechanical arts. The open face 132 forms the superior face of the container 131. Objects are inserted into and removed from the container 131 through the open face 132.

The assembly of the invention 100 is described in the following 6 paragraphs The first hinge 201 attaches the first end 211 of the left posterior brace 171 to the third end 213 of the left superior brace 172. The second hinge 202 attaches the seventh end 217 of the left spreader brace 174 to the face of the left posterior brace 171. The third hinge 203 attaches the eighth end 218 of the left spreader brace 174 to the face of the left anterior brace 173.

The fourth hinge 204 attaches the eleventh end 221 of the right posterior brace 181 to the thirteenth end 223 of the right superior brace 182. The fifth hinge 205 attaches the seventeenth end 227 of the right spreader brace 184 to the face of the right posterior brace 181. The sixth hinge 206 attaches the eighteenth end 228 of the right spreader brace 184 to the face of the right anterior brace 183.

The left anchor 125 attaches the fourth end 214 of the left superior brace 172 to the fifth end 215 of the left anterior brace 173. The left anchor 125 is removably attached to the anterior left sidewall 144 of the anterior seat 111. The right anchor 126 attaches the fourteenth end 224 of the right superior brace 182 to the fifteenth end 225 of the right anterior brace 183. The right anchor 126 is removably attached to the anterior right sidewall 145 of the anterior seat 111. The left handle grip 176 attaches to the ninth end 219 of the left handle extension 175. The right handle grip 186 attaches to the nineteenth end 229 of the right handle extension 185.

The first wheel 191 attaches to the second end 212 of the left posterior brace 171. The second wheel 192 attaches to the sixth end 216 of the left anterior brace 173. The third wheel 193 attaches to the sixteenth end 226 of the right anterior brace 183. The fourth wheel 194 attaches to the twelfth end 222 of the right posterior brace 181.

The twenty first end 231 of the anterior crosspiece 123 attaches to the face of the left anterior brace 173. The twenty second end 232 of the anterior crosspiece 123 attaches to the face of the right anterior brace 183. The twenty third end 233 of the posterior crosspiece 124 attaches to the face of the left posterior brace 171. The twenty fourth end 234 of the posterior crosspiece 124 attaches to the face of the right posterior brace 181.

The described attachments of the anterior crosspiece 123, the posterior crosspiece 124, the left anchor 125, and the right anchor 126, to the left trestle 121 and the right trestle 122 hold the left trestle 121 is a fixed position relative to the right trestle 122.

To collapse the invention 100, the seating assembly 101 is detached from the left anchor 125 and the right anchor 126. The left posterior brace 171, the left superior brace 172, the left anterior brace 173, and the left spreader brace 174 are then rotated relative to the first hinge 201, the second hinge 202, the third hinge 203, and the left anchor 125 to collapse the left trestle 121. Simultaneously, the right posterior brace 181, the right superior brace 182, the right anterior brace 183, and the right spreader brace 184 are then rotated relative to the fourth hinge 204, the fifth hinge 205, the sixth hinge 206, and the right anchor 126 to collapse the right trestle 122.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of an object. When comparing two objects, the anterior object is the object that is closer to front of the object.

Caster: As used in this disclosure, a caster is a wheel that is mounted on a swivel that allows the wheel to adjust, or swivel, the direction of rotation of the wheel to the direction of motion desired for the wheel.

Cushion: As used in this disclosure a cushion is a structure formed with a pad that is used to prevent injury or damage to a person or object.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Detent: As used in this disclosure, a detent is a device for positioning and holding a first object relative to a second object such that the position of the first object relative to the second object is adjustable.

Force of Gravity: As used in this disclosure, the force of gravity refers to a vector that indicates the direction of the pull of gravity on an object at or near the surface of the earth.

Grip: As used in this disclosure, a grip is an accommodation formed within an object that allows the object to be grasped or manipulated by a hand.

Handle: As used in this disclosure, a handle is an object by which a tool, object, or door is held or manipulated with the hand.

Harness: As used in this disclosure, a harness is an apparatus comprising a plurality of straps and one or more fasteners that is used to fasten or anchor a first person or first object to a second object. The phrase N point harness refers to the installation of the harness wherein the harness has N anchor points. For example, a 2 point harness has two anchor points while a 5 point harness has 5 anchor points.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Load Path: As used in this disclosure, a load path refers to a chain of one or more structures that transfers a load generated by a raised structure or object to a foundation, supporting surface, or the earth.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Pivot: As used in this disclosure, a pivot is a rod or shaft around which an object rotates or swings.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Posterior: As used in this disclosure, posterior is a term that is used to refer to the side of an object that is distal or in the opposite direction of the anterior side. When comparing two items, the posterior item is the item that is distal from the front of the object.

Roll: As used in this disclosure, the term roll refers to the motion of an object that is facilitated by the rotation of one or more wheels or a casters.

Shaft: As used in this disclosure, a shaft is a long, narrow and rigid cylindrical structure that is used as: 1) a structural element of a larger object; or 2) as a grip or lever for a handle.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hand propelled carriage comprising:
   wherein the hand propelled carriage comprises a seating assembly, a frame, and a storage bin;
   wherein the seating assembly and the storage bin are attached to the frame;
   wherein the seating assembly is a dual seat structure in which the occupants of a chair are seated;
   wherein the dual seats of the seating assembly face opposite directions and share the same back plate;
   wherein the hand propelled carriage is configured for use with one or more occupants;
   wherein the frame comprises a left trestle, a right trestle, an anterior crosspiece, a posterior crosspiece, a left anchor, a right anchor, and a plurality of wheels;
   wherein the left trestle comprises a left posterior brace, a left superior brace, a left anterior brace, a left spreader brace, a left handle extension, a left handle grip, a first hinge, a second hinge, and a third hinge;
   wherein the left posterior brace is a telescopic shaft;
   wherein the left superior brace is a telescopic shaft;
   wherein the left anterior brace is a shaft;
   wherein the left spreader brace is a shaft;
   wherein the left handle extension is a shaft;
   wherein the left handle grip is a loop like structure that forms a grip;
   wherein the first hinge is a locking hinge;
   wherein the second hinge is a locking hinge;
   wherein the third hinge is a locking hinge.

2. The hand propelled carriage according to claim 1
   wherein the seating assembly comprises an anterior seat and a posterior seat;
   wherein the occupant of the anterior seat faces the anterior direction;
   wherein the occupant of the posterior seat faces the posterior direction;
   wherein the anterior seat faces the anterior direction;
   wherein the posterior seat faces the posterior direction.

3. The hand propelled carriage according to claim 2
   wherein the back plate is a rectangular plate;
   wherein the back plate is further defined with an anterior surface and a posterior surface;

wherein the back plate forms a backrest of the anterior seat;

wherein the back plate forms a backrest of the posterior seat.

4. The hand propelled carriage according to claim 3
wherein the anterior seat comprises an anterior bench, an anterior 3 point harness, an anterior guardrail, an anterior left sidewall, and an anterior right sidewall;
wherein the anterior bench is a horizontal surface;
wherein the anterior bench provides horizontal support for the occupant of the anterior seat;
wherein the anterior 3 point harness, the anterior guardrail, the anterior left sidewall; and the anterior right side wall contain the occupant within the anterior seat.

5. The hand propelled carriage according to claim 4
wherein the anterior bench attaches to the back rest;
wherein the anterior bench projects perpendicularly away from the anterior surface of the back plate.

6. The hand propelled carriage according to claim 5 wherein the anterior 3 point harness is a harness that secures the occupant to the anterior seat.

7. The hand propelled carriage according to claim 6
wherein the anterior guardrail is a member that forms a barrier that prevents the occupant of the anterior bench from falling out of the anterior bench in a direction away from the back plate;
wherein the anterior left sidewall is a barrier that prevents the occupant of the anterior bench from falling out of the left side of the anterior bench;
wherein the anterior right sidewall is a barrier that prevents the occupant of the anterior bench from falling out of the right side of the anterior bench.

8. The hand propelled carriage according to claim 7
wherein the posterior seat comprises a posterior bench, a posterior 3 point harness, a posterior guardrail, a posterior left sidewall, and a posterior right sidewall;
wherein the posterior bench is a horizontal surface;
wherein the posterior bench provides horizontal support for the occupant of the posterior seat;
wherein the posterior 3 point harness, the posterior guardrail, the posterior left sidewall; and the posterior right side wall contain the occupant within the posterior seat.

9. The hand propelled carriage according to claim 8
wherein the posterior bench attaches to the back plate;
wherein the posterior bench is a horizontal surface;
wherein the posterior bench provides horizontal support for the occupant of the posterior seat;
wherein the posterior bench projects perpendicularly away from the posterior surface of the back plate.

10. The hand propelled carriage according to claim 9 wherein the posterior 3 point harness is a harness that secures the occupant to the posterior seat.

11. The hand propelled carriage according to claim 10
wherein the posterior guardrail is a member that forms a barrier that prevents the occupant of the posterior bench from falling out of the posterior bench in a direction away from the back plate;
wherein the posterior left sidewall is a barrier that prevents the occupant of the posterior bench from falling out of the left side of the posterior bench;
wherein the posterior right sidewall is a barrier that prevents the occupant of the posterior bench from falling out of the right side of the posterior bench.

12. The hand propelled carriage according to claim 11
wherein the frame is a scaffolding;
wherein the left trestle is an open framework of interconnected members that supports the left side of the hand propelled carriage;
wherein the right trestle is an open framework of interconnected members that supports the right side of the hand propelled carriage;
wherein the anterior crosspiece attaches the left trestle to the right trestle;
wherein the posterior crosspiece attaches the left trestle to the right trestle;
wherein the left anchor attaches to the left trestle;
wherein the right anchor attaches to the right trestle;
wherein the load path of the frame is terminated by the plurality of wheels;
wherein the plurality of wheels allow the hand propelled carriage to be rolled along the supporting surface.

13. The hand propelled carriage according to claim 12
wherein the left posterior brace, the left superior brace, the left anterior brace, the left spreader brace, the left handle extension, the left handle grip, the first hinge, the second hinge, and the third hinge are interconnected;
wherein the left posterior brace is further defined with a first end and a second end;
wherein the left superior brace is further defined with a third end and a fourth end;
wherein the left anterior brace is further defined with a fifth end and a sixth end;
wherein the left spreader brace is further defined with a seventh end and an eighth end;
wherein the left handle extension is further defined with a ninth end and a tenth end.

14. The hand propelled carriage according to claim 13
wherein the right trestle comprises a right posterior brace, a right superior brace, a right anterior brace, a right spreader brace, a right handle extension, and a right handle grip;
wherein the right trestle further comprises a fourth hinge, a fifth hinge, and a sixth hinge;
wherein the right posterior brace, the right superior brace, the right anterior brace, the right spreader brace, the right handle extension, the right handle grip, the fourth hinge, the fifth hinge, and the sixth hinge are interconnected;
wherein the right posterior brace is further defined with an eleventh end and a twelfth end;
wherein the right superior brace is further defined with a thirteenth end and a fourteenth end;
wherein the right anterior brace is further defined with a fifteenth end and a sixteenth end;
wherein the right spreader brace is further defined with a seventeenth end and an eighteenth end;
wherein the right handle extension is further defined with a nineteenth end and a twentieth end.

15. The hand propelled carriage according to claim 14
wherein the right posterior brace is a telescopic shaft;
wherein the right superior brace is a telescopic shaft;
wherein the right anterior brace is a shaft;
wherein the right spreader brace is a shaft;
wherein the right handle extension is a shaft;
wherein the right handle grip is a loop like structure that forms a grip;
wherein the fourth hinge is a locking hinge;
wherein the fifth hinge is a locking hinge;
wherein the sixth hinge is a locking hinge.

16. The hand propelled carriage according to claim 15
wherein the plurality of wheels comprises a first wheel, a second wheel, a third wheel, and a fourth wheel;
wherein the first wheel is a wheel;
wherein the second wheel is a rotating device that is selected from the group consisting of a wheel or a caster;
wherein the third wheel is a rotating device that is selected from the group consisting of a wheel or a caster;
wherein the fourth wheel is a wheel.

17. The hand propelled carriage according to claim 16
wherein the anterior crosspiece is a member that attaches the left trestle to the right trestle;
wherein the posterior crosspiece is a member that attaches the left trestle to the right trestle;
wherein the anterior crosspiece is further defined with a twenty first end and a twenty second end;
wherein the posterior crosspiece is further defined with a twenty third end and a twenty fourth end.

18. The hand propelled carriage according to claim 17
wherein the left anchor is a rotating structure;
wherein the right anchor is a rotating structure;
wherein the storage bin is storage compartment that is located underneath the seating assembly;
wherein the storage bin is a container that is further defined with an open face.

19. The hand propelled carriage according to claim 18
the first hinge attaches the first end of the left posterior brace to the third end of the left superior brace;
wherein the second hinge attaches the seventh end of the left spreader brace to the left posterior brace;
wherein the third hinge attaches the eighth end of the left spreader brace to the left anterior brace;
wherein the fourth hinge attaches the eleventh end of the right posterior brace to the thirteenth end of the right superior brace;
wherein the fifth hinge attaches the seventeenth end of the right spreader brace to the right posterior brace;
wherein the sixth hinge attaches the eighteenth end of the right spreader brace to the right anterior brace;
wherein the left anchor attaches the fourth end of the left superior brace to the fifth end of the left anterior brace;
wherein the left anchor is removably attached to the anterior left sidewall of the anterior seat;
wherein the right anchor attaches the fourteenth end of the right superior brace to the fifteenth end of the right anterior brace;
wherein the right anchor is removably attached to the anterior right sidewall of the anterior seat;
wherein the left handle grip attaches to the ninth end of the left handle extension;
wherein the right handle grip attaches to the nineteenth end of the right handle extension;
wherein the first wheel attaches to the second end of the left posterior brace;
wherein the second wheel attaches to the sixth end of the left anterior brace;
wherein the third wheel attaches to the sixteenth end of the right anterior brace;
wherein the fourth wheel attaches to the twelfth end of the right posterior brace;
wherein the twenty first end of the anterior crosspiece attaches to the left anterior brace;
wherein the twenty second end of the anterior crosspiece attaches to the right anterior brace;
wherein the twenty third end of the posterior crosspiece attaches to the left posterior brace;
wherein the twenty fourth end of the posterior crosspiece attaches to the right posterior brace;
wherein the described attachments of the anterior crosspiece, the posterior crosspiece, the left anchor, and the right anchor, to the left trestle and the right trestle hold the left trestle is a fixed position relative to the right trestle;
wherein the back plate is covered in a padding material;
wherein the anterior bench is covered in a padding material;
wherein the anterior left sidewall is covered in a padding material;
wherein the anterior right sidewall is covered in a padding material;
wherein the posterior bench is covered in a padding material;
wherein the posterior left sidewall is covered in a padding material;
wherein the posterior right sidewall is covered in a padding material that acts as a cushion.

* * * * *